United States Patent
Bonen (12)

(10) Patent No.: US 6,241,815 B1
(45) Date of Patent: Jun. 5, 2001

(54) GYPSUM-CEMENT SYSTEM FOR CONSTRUCTION MATERIALS

(75) Inventor: David Bonen, Skokie, IL (US)

(73) Assignee: United States Gypsum Company, Chicago, IL (US)

(*) Notice: Subject to any disclaimer, the term of this patent is extended or adjusted under 35 U.S.C. 154(b) by 0 days.

(21) Appl. No.: 09/371,351

(22) Filed: Aug. 10, 1999

(51) Int. Cl.$^7$ ..................................................... C04B 11/30

(52) U.S. Cl. ........................ 106/735; 106/709; 106/715; 106/718; 106/719; 106/720; 106/721; 106/722; 106/724; 106/725; 106/726; 106/727; 106/728; 106/732; 156/39; 428/703

(58) Field of Search ................................. 106/718, 719, 106/720, 721, 722, 724, 725, 726, 727, 728, 732, 735, 709, 715; 156/39; 428/703

(56) References Cited

U.S. PATENT DOCUMENTS

| | | | |
|---|---|---|---|
| 4,350,533 | 9/1982 | Galer et al. | 106/89 |
| 4,488,909 | 12/1984 | Galer et al. | 106/89 |
| 4,494,990 | 1/1985 | Harris | 106/90 |
| 4,661,159 | 4/1987 | Ortega et al. | 106/89 |
| 5,439,518 | 8/1995 | Francis et al. | 106/705 |
| 5,685,903 | 11/1997 | Stav et al. | 106/735 |
| 5,718,759 | 2/1998 | Stav et al. | 106/735 |
| 5,858,083 | 1/1999 | Stav et al. | 106/735 |
| 5,958,131 | * 9/1999 | Asbridge et al. | 106/718 |

FOREIGN PATENT DOCUMENTS

| | | | |
|---|---|---|---|
| 32 15777 A1 | 11/1983 | (DE) | C04B/12/02 |
| 0 188 618 A1 | 7/1986 | (EP) | C04B/7/21 |
| 0 271 329 A2 | 5/1988 | (EP) | C04B/7/32 |
| 54-99126 | * 8/1978 | (JP) . | |
| 59-232950 | * 12/1984 | (JP) . | |
| WO 95/33698 | 12/1995 | (WO) | C04B/11/30 |

OTHER PUBLICATIONS

Bentur, A., et al., "Gypsum Of Improved Performance Using Blends With Portland Cement And Silica Fume," *Advances In Cement Research*, vol. 6, No. 23, pp. 109–116 (1994) (No month).

Goldman, A., et al., "Properties Of Cementitious Systems Containing Silica Fume or Nonreactive Microfillers," *Advn Cem Bas Mat*, Elsevier Science Inc., [1], pp. 209–215 (1994) (No month).

Kovler, K., et al., "Setting And Hardening Of Gypsum–Portland Cement–Silica Fume Blends, Part I: Temperature And Setting Expansion," *Cement and Concrete Research*, Elsevier Science Ltd., vol. 28, No. 3, pp. 423–437 (1998) (No month).

Singh, Manjit, et al., "Phosphogypsum–Fly Ash Cementitious Binder–Its Hydration And Strength Development," *Cement and Concrete Research*, Elsevier Science Ltd., vol. 25, No. 4, pp. 752–758 (1995) (No month).

Zhang, Min–Hong, et al., "Pozzolanic Reactivity Of Lightweight Aggregates," *Cement and Concrete Research*, Pergamon Press plc. vol. 20, pp. 884–890 (1990) (No month).

PCT Search Report for International Application No. WO 95/33698 (Nov. 2000).

* cited by examiner

*Primary Examiner*—Anthony Green
(74) *Attorney, Agent, or Firm*—Jenkens & Gilchrist

(57) ABSTRACT

A composition for use in construction materials, which may be substituted for high performance concrete, patching materials, joint compounds, and the like, such as backer boards or panels, which includes a settable calcium sulfate, preferably a hemihydrate, Portland cement, a finely divided pozzolanic material, lime, and an aggregate, optionally including other additives. The volume ratio of the aggregate to the combined calcium sulfate, Portland cement, pozzolanic material, and lime (a cementitious binder) is equal to or greater than 2/1. Panels made from this composition are useful, particularly when exposed to water since they have good dimensional stability.

24 Claims, 3 Drawing Sheets

GYPSUM-CEMENT SYSTEM FOR CONSTRUCTION MATERIALS

BACKGROUND OF THE INVENTION

This invention relates generally to the field of construction materials, particularly boards or panels, patching materials, joint compounds, and the like, which are made with gypsum and cement. Such materials may include more gypsum than cement, but still have good water resistance and strength.

Both gypsum and Portland cement (generally hereinafter "cement") are well known as construction materials. Gypsum (calcium sulfate dihydrate) is the principal component of the familiar wallboard, where it is faced with paper to provide strength and a smooth surface. Cement is used in various applications where its hardness, water resistance, and durability make it valuable, such as in concrete structures. Cement is also used in building panels where its hardness and water resistance are important.

Gypsum is generally produced by the rapid hydration of calcium sulfate hemihydrate, while Portland cement operates mainly by the relatively slower hydration of calcium silicate and aluminate minerals. Consequently, adding calcium sulfate hemihydrate to cement offers the benefits of improving the productivity of facilities which manufacture cement-containing panels, since the mixture hardens rapidly. Gypsum is, however, somewhat soluble in water, and mixtures which include both gypsum and cement are not as water resistant as cement alone or cement containing a minor amount of gypsum. Furthermore, it is well known that gypsum reacts with one of the components of cement, namely, tricalcium aluminate ($3CaO.Al_2O_3$, abbreviated as $C_3A$) to form ettringite [$3CaO.Al_2O_3.(CaO.SO_3)_3.32H_2O$ also $C_6A\bar{S}_3H_{32}$], which may cause expansion and undesirable cracking. Formation of ettringite can be useful, provided that it occurs early in the process of making panels (referred to as primary ettringite), since it provides fast setting and early mechanical strength. Once the mixture of gypsum and cement has been solidified, however, the formation of ettringite (referred to as secondary ettringite) is generally not desirable. Consequently, efforts have been made to prevent the formation of secondary ettringite in gypsum and cement formulations. This has been referred to as preventing an internal "sulfate attack," since it is the reaction of gypsum, $CaSO_4.2H_2O$, with tricalcium aluminate and water, which results in the formation of ettringite. The tricalcium aluminate is quite soluble and cement often includes a small amount of gypsum to react with dissolved $C_3A$. A high alumina content does not necessarily mean that a cement is susceptible to sulfate attack, because the reactivity of the alumina-bearing compounds matters more than the total alumina content.

An important approach to limiting the formation of ettringite has been to add "pozzolanic" materials. In general, pozzolanic materials are defined by ASTM C618-97 as " . . . siliceous or siliceous and aluminous materials which in themselves possess little or no cementitious value but will, in finely divided form and in the presence of moisture, chemically react with calcium hydroxide at ordinary temperatures to form compounds possessing cementitious properties." For a given pozzolanic material, the finer the material is, the greater the pozzolanic activity. Also, amorphous materials are considered to possess greater pozzolanic activity. Finely divided amorphous silica, such as silica fume, has been found to have substantial pozzolanic activity. A related material, microsilica, is even more pozzolanic than silica fume. A crystalline silica having a large particle size, such as sand, would not be expected to have significant pozzolanic activity. Other naturally derived materials which, when finely divided, have been referred to as pozzolanic include pumice, perlite, diatomaceous earth, tuff, trass, etc. Man-made pozzolanic materials include metakaolin, microsilica, silica fume, ground granulated blast furnace slag, and fly ash.

Differences in pozzolanic activity may be related to the chemical reactivity of the components. That is, the quantity of silica or alumina in a pozzolanic material may not be as significant as the form in which they are found. The literature suggests that the temperatures used in processing of naturally derived or man-made pozzolans may determine whether or not the product is an active pozzolan. Thus, a high silica content may not be necessary, provided that the silica has been activated by its processing. Similarly, the alumina content of pozzolanic materials has been contended to be important. But, a high alumina content may have little effect, provided that the aluminum compounds are not reactive. For example, metakaolin contains less silica and much more alumina than silica fume, but has been found by the present inventor to provide superior mechanical performance in products made with metakaolin. Similarly, blast furnace slag contains less silica, but is more active than fly ash. It may be concluded that the pozzolanic activity of silica and alumina-containing materials should be considered only as potential until the pozzolanic properties are validated by appropriate tests.

In U.S. Pat. No. 4,494,990, Harris disclosed the effect of adding a pozzolanic material to a mixture of alpha gypsum (alpha hemihydrate) and Portland cement. He used a "sulfate reactivity factor" to determine whether the pozzolanic material was useful. This sulfate reactivity factor requires knowledge of the amounts of various components of the cement present and the relative amounts of the pozzolanic material, gypsum and cement. Broadly, the composition of Harris would contain 25–60 wt % of cement, 40–75 wt % of calcium sulfate hemihydrate (typically the alpha form), and 3–50 wt % of a pozzolan, in his examples, silica fume, having a sulfate reactivity factor less than 12.

In their article in Cement and Concrete Research, Vol. 25, No. 4, pp. 752–758, 1995, Singh and Garg discussed their work with a binder made of calcined phosphogypsum, fly ash, hydrated lime, and Portland cement.

In the same journal, Vol. 28, No. 3, pp. 423–437, 1998, Kovler reported on his work with blends of gypsum, Portland cement, and silica fume. Kovler stated "[s]uch blends can possess the advantages of gypsum (early hardening, high early strength, enhanced workability) and Portland cement (improved durability in moist conditions), but are free of the deleterious effect of ettringite and thaumasite, which are formed when gypsum and Portland cement react." (Note that "gypsum" is often used to refer to hemihydrates, as is done here.)

Bentur, Kovler and Goldman reported on similar compositions in Advances in Cement Research, Vol. 6, No. 23, pp. 109–116, 1994. They tested mixtures of gypsum, Portland cement, and silica fume having more than 92 wt % silica and noted that improved wet strength " . . . was explained by the reduction in ettringite formation and the development of a microstructure in which gypsum crystals were engulfed by CSH." By CSH was meant calcium silicate hydrate, according to a shorthand notation commonly used in the field, which constitutes the main constituent of Portland cement.

A high early strength cement was disclosed in U.S. Pat. No. 4,350,533 by Galer et al. of United States Gypsum Company. The high strength was obtained by forming substantial amounts of ettringite from mixtures containing high alumina cement and calcium sulfate (all forms, including gypsum, said to be useful). Pozzolanic materials, such as fly ash, montmorillonite clay, diatomaceous earth, and pumice, were considered optional ingredients, but could replace up to about 20% of the cement. A related and commonly assigned patent is U.S. Pat. No. 4,488,909.

In EP Patent No. 271,329, compositions containing 70% ettringite and up to 30% CSH were made using "non-traditional materials," including $CaSO_4$.

In U.S. Pat. No. 4,661,159, Ortega et al. disclosed a floor underlayment composition which included alpha calcium sulfate hemihydrate (alpha gypsum), beta calcium sulfate hemihydrate (beta gypsum), fly ash, and Portland cement.

In U.S. Pat. No. 5,439,518, Francis et al. disclosed a composition including a fly ash containing up to 30% CaO which reacts with gypsum to form a cement. Optionally, up to 20% Portland cement may be added.

In U.S. Pat. Nos. 5,685,903 and 5,718,759, Stav et al. disclosed a composition which contains 20–75 wt % calcium sulfate beta-hemihydrate, 10–50 wt % of a cement selected from the group consisting of Portland cement, a blend of Portland cement and fly ash, and a blend of Portland cement and ground blast slag, and mixtures thereof, 4–20 wt % silica fume, and 1–50 wt % of a pozzolanic aggregate. The aggregate was defined as having an average particle size larger than that of Portland cement, i.e., larger than 45 microns. This contrasts with the silica fume, which is an active pozzolanic material and has a much smaller particle size, said to be about 0.1–0.3 microns. The Stav et al. composition was contended to have improved water resistance and higher compressive strength compared to similar compositions which used aggregates considered to be non-pozzolanic, such as sand, clays and calcium carbonate.

In U.S. Pat. No. 5,858,083, Stav et al. stated that the composition of silica fume produced from silicon production is important for achieving the desired results. The maximum alumina content was said to be 0.6 wt %, and the minimum amorphous silica to be 92 wt %.

The effect that aggregates may have on the strength of the composition, which Stav et al. attributed to pozzolanic activity, may instead relate to other factors, such as the shape, size, and gradation of the particles, mechanical packing, roughness, water absorption, etc.

Silica fume and other pozzolans have been suggested as replacements for a portion of cement to impart various properties. Addition of materials that potentially may be classified as pozzolanic does not, however, necessarily result in greater strength. In a publication entitled "Pozzolanic Reactivity Of Lightweight Aggregates," Cement and Concrete Research, Pergamon Press plc, Vol. 20, pp. 884–890, 1990, Zhang and Gjørv studied the reactivity of expanded clay and fly ash aggregate having a silica content of about 50–60 wt % and an alumina content of 17–27 wt %. The expanded clay and fly ash aggregates were ground to a Blaine fineness of about 4,000 $cm^2/g$, thus, their reactivity would be expected to have been much enhanced as compared with their use as aggregates. Nevertheless, the ground clay and fly ash aggregate were practically non-reactive and the authors concluded "a significant effect of pozzolanic reaction between cement paste and lightweight aggregates should not be expected." Zhang and Gjørv studied the effect of the temperature at which clay aggregates were fired on compressive strength of concrete. They concluded that "the low degree of pozzolanic reactivity may be the result of a recrystallization of the mineral compounds during the manufacturing process of the aggregate." In contrast, silica fume showed a significant degree of reactivity. The silica fume was much finer (19.8 $m^2/g$) and had 91.7 wt % $SiO_2$ and 0.2 wt % $Al_2O_3$.

A. Goldman and A. Bentur found that silica fume has a strengthening effect on concrete which related to its ability to act as a microfiller, rather than to its chemical reactivity. "Properties Of Cementitious Systems Containing Silica Fume Or Nonreactive Microfillers," Advn Cem Bas Mat, Elsevier Science, Inc., [1], pp. 209–215, 1994.

The experience of others, as discussed above, did not provide an answer to the problem faced by the present inventor. Namely, how to substitute gypsum for cement in panels used for applications where water could be expected, such as panels supporting ceramic tiles, underlay, and the like. Currently, panels having a large cement content are used, but these are heavy and costly, and lighter panels which still retain the necessary water resistance are desired. Another essential characteristic of such panels, however, is that they must not expand to exceed the strain capacity of other elements, such as tiles, joints, fasteners, studs, etc., when in the presence of water. The tiles, panels or joints will crack, leading to further water intrusion and deterioration of the materials. Generally, the expansion in water of materials made with gypsum—cement is too large to be acceptable. The present inventor has found a solution to the problem, thus permitting manufacture of lighter weight, water resistant panels which, when in contact with water, expand only slightly and do not exceed the strain capacity of the other elements.

SUMMARY OF THE INVENTION

The invention relates to construction materials which employ cementitious mixtures of settable calcium sulfate, particularly calcium sulfate hemihydrate, Portland cement, a pozzolanic material, and lime, with an aggregate which have been found to have outstanding performance when immersed in water. The volume ratio of the aggregate to the cementitious mixture of calcium sulfate, Portland cement, pozzolanic material and lime is equal to or greater than 2/1.

Although the compositions may vary depending on the properties of the selected components, in many embodiments, the settable calcium sulfate (e.g., a hemihydrate) is present as about 25–80 wt %, the Portland cement is present as about 10–60 wt %, and the pozzolanic material is present as up to 40 wt %, and the lime is less than about 5 wt % of the cementitious components of the mixture, that is, those components which react to form a binder. The aggregate is not considered a cementitious component. Various aggregates may be used; one preferred aggregate is lightweight sintered shale.

The pozzolanic material preferably is silica fume or fine particles of metakaolin or ground granulated blast furnace slag. Metakaolin has been found to provide increased compressive strength relative to silica fume and, thus, in one aspect, the invention relates to compositions of calcium hemihydrate, Portland cement, and metakaolin, which need not include aggregate.

In some embodiments of the invention, one or more of the following additives are included: an accelerator for Portland cement such as calcium chloride, a superplasticizer such as the sodium salt of polynaphthalene sulfonate, an accelerator for gypsum such as calcium sulfate dihydrate, a retarder such as diethylenetriaminepentaacetic acid, glycols, and a stable foam.

In one embodiment, the invention is a building panel which includes the composition described above. It may have a scrim surface reinforcement on one or both of its faces to provide mechanical support and bending strength to the cured composition. Such panels have very small linear expansion when exposed to water and may be substituted for heavier cement panels previously employed as backer boards for ceramic tiles or other applications.

DESCRIPTION OF ILLUSTRATIVE EMBODIMENTS

Figure 1:
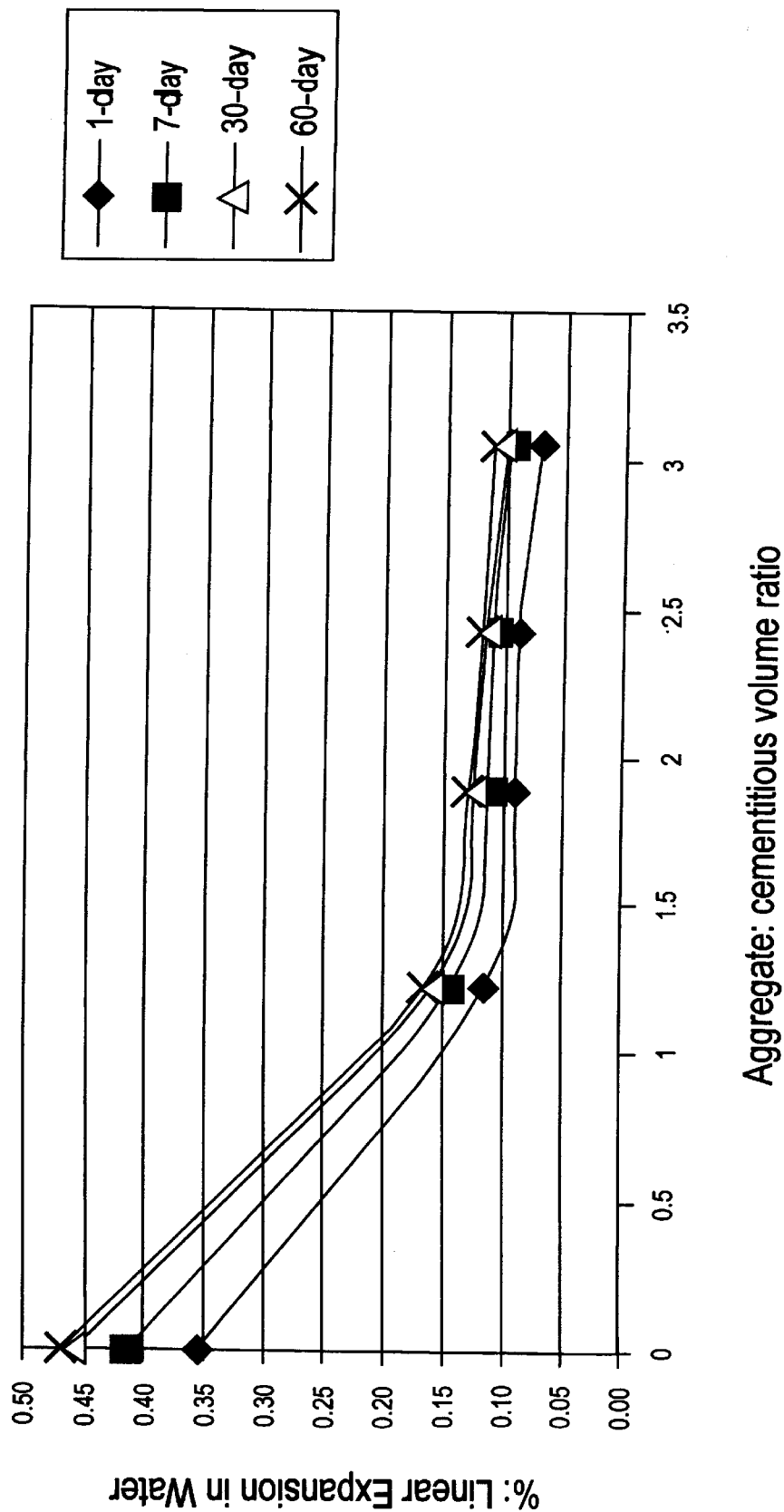
FIG. 1 is a graph of the relation between the volume ratio of the aggregate and a cementitious mixture of calcium sulfate hemihydrate, Portland cement, pozzolanic material (silica fume), and lime, and the expansion when immersed in water of a panel made with the composition of the invention.

The reactions which occur in cement and gypsum chemistry are the subject of many publications and patents, as discussed above, and will be familiar to those skilled in the art. The discussion presented below includes some general background information in addition to describing the illustrative embodiments.

Gypsum

Gypsum is a naturally occurring mineral, calcium sulfate dihydrate, $CaSO_4 \cdot 2H_2O$ (unless otherwise indicated, hereafter, "gypsum" will refer to the dihydrate form of calcium sulfate). After being mined, the raw gypsum is thermally processed to form a settable calcium sulfate, which may be anhydrous, but more typically is the hemihydrate, $CaSO_4 \cdot \frac{1}{2}H_2O$. For the familiar end uses, the settable calcium sulfate reacts with water to solidify by forming the dihydrate (gypsum). The hemihydrate has two recognized morphologies, alpha and beta hemihydrate. These are selected for various applications based on their physical properties. Upon hydration, alpha hemihydrate is characterized by giving rise to rectangular-sided crystals of gypsum, while beta hemihydrate is characterized by hydrating to produce needle-shaped crystals of gypsum, typically with large aspect ratio. In the present invention, either or both of the alpha or beta forms may be used, depending on the mechanical performance required. The beta form generates less dense microstructures and is preferred for low density products. Alpha hemihydrate could be substituted for beta hemihydrate to increase strength and density or they could be combined to adjust the properties, as will be seen in the examples below.

Cement

While cement generally refers to any mixture of lime, alumina, and silica that will set by hydration to a hard product when mixed with water, the cement of particular interest with regard to the present invention is Portland cement. Such cements include the above-mentioned ingredients and iron oxide. Portland cement is composed of four main phases, tricalcium silicate ($3CaO \cdot SiO_2$, also called $C_3S$), dicalcium silicate ($2CaO \cdot SiO_2$, also called $C_2S$), tricalcium aluminate ($3CaO \cdot Al_2O_3$, also called $C_3A$), and tetracalcium aluminoferrite ($4CaO \cdot Al_2O_3 \cdot Fe_2O_3$, also called $C_4AF$). These principal phases are prepared by ignition of limestone and clay. There are minor amounts of other compounds which are present, such as calcium sulfate and other double salts of alkaline sulfates, calcium oxide, and magnesium oxide.

There are several recognized classes of Portland Cement, particularly ASTM Is Types I to V. Related classes are ASTM Types IP, IS, and other types of low calcium aluminate cements, such as Type C (an oil well cement having a low $C_3A$ content). For purposes of the present invention, any of these classes are considered to be useful. Type III Portland cement is preferred if rapid early-age strength is sought. Types V, IP, IS, and C may be useful for reducing the risk of sulfate attack. Particularly preferred are Types I, III, V, IP, IS, and C.

Aggregate

This term is applied to any particulates, including sand, crushed stone, and the like, which are used in formulations including a binder, such as Portland cement. The size and gradation of the particles, their surface morphology, water absorption, chemical compatibility, and reactivity are considered to affect the performance of any specific formulation. In the present invention, the volume ratio of the aggregate to the cementitious binder is at least 2/1. Generally, the particle size of aggregates used in this invention should be limited to no more than about 5 wt % smaller than 20 $\mu$m. The maximum particle size will depend on the thickness of the product. For example, for a panel having 0.5" (12.7 mm) thickness, the maximum particle size will be smaller than 4.75 mm (i.e., pass through about a 4 mesh sieve). As noted above, some aggregates may display some pozzolanic activity, as defined by tests such as ASTM C618-97. The Stav et al. '903 patent requires that aggregates used in its formulation have pozzolanic activity. Although a test was not suggested to define which aggregates were active, Stav et al. considered pumice and hollow siliceous spheres to be pozzolanic, but calcium carbonate, sand, and certain clays were said to be non-pozzolanic. The present inventor has found that aggregates of both types are useful in his cementitious compositions. He prefers to use expanded shale or other siliceous particles classified as non-pozzolanic according to ASTM C618-97.

As previously discussed, pozzolanic activity can be related to various factors, including particle size and the chemical reactivity of the silica and alumina compounds. In general, the present inventor considers most aggregates, which have relatively large particles compared to cement or pozzolans, to have substantially no pozzolanic properties so that their effect on compressive strength of the composition is related to other factors, such as particle size, gradation, surface morphology, and water absorption.

Pozzolanic Materials

As noted already, pozzolanic materials have been defined in ASTM C618-97 as " . . . siliceous or siliceous and aluminous materials which in themselves possess little or no cementitious value but will, in finely divided form and in the presence of moisture, chemically react with calcium hydroxide at ordinary temperatures to form compounds possessing cementitious properties." ASTM C311, Sections 26–30, Vol. 04.02, provides a test method for determining the pozzolanic effect of materials by measuring a strength activity index, defined as the ratio of the compressive strength of the test mixture to the reference mixture. In the test mixture, 20% of the cement mass is replaced by the material being tested for pozzolanic activity. In effect, the test determines whether the material being tested can be substituted for cement.

One of the ingredients of cementitious formulations of the invention is a finely divided pozzolanic material, such as silica fume, metakaolin, ground granulated blast furnace slag, or pulverized fly ash. Generally, the average particle size will be less than is typical of Portland cement, having a Blaine surface area greater than about 2000 cm²/g. Other recognized pozzolans may be included, provided that they are used in amounts which provide equivalent performance. Silica fume is formed in a high temperature induction furnace as a by-product of silicon metal and ferro-silicon alloy production and has a high percentage of amorphous silica. In contrast, metakaolin, ground granulated blast furnace slag or pulverized fly ash have a much lower silica content and large amounts of alumina, but they can be effective pozzolanic materials.

A pozzolanic material which has particular value in the invention is metakaolin. It has been found to increase the compressive strength of mixtures of calcium sulfate hemihydrate and Portland cement, with or without the presence of aggregate. In addition, metakaolin improves the volume stability of the mixture. Thus, for the same aggregate:cement ratio, both the shrinkage and expansion in water are smaller than silica fume mixtures. Therefore, metakaolin is considered particularly useful, as it increases strength and decreases linear movement or, alternatively, for the same linear movement, less aggregate is needed. Kaolin is an aluminum silicate clay with a relatively high alumina content of about 40 wt % and a silica content of 50–60 wt %. Metakaolin is a processed form of the natural clay.

Ground granulated blast furnace slag is a by-product of iron ore smelting and has often been considered to have pozzolanic activity, provided that the ratio of calcium plus alumina to silica exceeds a certain level. Such slags also contain relatively high amounts of alumina.

Pulverized fly ash is a finely divided material recovered from the combustion of ground coal. It contains relatively large amounts of inorganic compounds of aluminum, silicon and other elements derived from the inorganic fraction of the coal.

Compositions

The compositions of the invention contain five principal ingredients, namely, a binder including a settable calcium sulfate such as a hemihydrate, Portland cement, a pozzolanic material such as silica fume, metakaolin, ground granulated blast furnace slag or pulverized fly ash, and lime, and an aggregate. The reactive materials, excluding the aggregate, may be referred to as cementitious. In one aspect, the invention includes cementitious compositions containing metakaolin as the pozzolanic material, even in the absence of aggregate. In particular applications, the cementitious ingredients are mixed with a number of other possible additives up to 2 wt % of an accelerator for Portland cement such as calcium chloride, up to about 1.8 wt % of a superplasticizer such as the sodium salt of polynaphthalene sulfonate, about 0.3–2.0 wt % of an accelerator for gypsum such as calcium sulfate dihydrate, up to about 0.08 wt % of a retarder such as DTPA (diethylenetriaminepentacetic acid), tartaric acid, or an alkali salt of tartaric acid, and about 2–7 wt % of shrinkage reducing agents made of blends of glycols, based on the amount of water used with the cementitious material, and up to about 75% by volume of a stable foam for reducing the weight of the aggregate and binder.

The settable calcium sulfate used may be anhydrous or, more typically, the partially hydrated hemihydrate, either the alpha or beta form, the latter being the material of choice in many applications, where its lower cost and density offsets its somewhat lower mechanical properties, compared to alpha hemihydrate. In general, it is preferred to use a large amount of the settable calcium sulfate, since it is the least expensive of the principal components. A significant amount of Portland cement is needed, however, to provide its inherent properties. In many preferred embodiments, the settable calcium sulfate, e.g., a hemihydrate, is present as about 50–80 wt % based on the total of the cementitious materials, that is, the calcium sulfate hemihydrate, cement, pozzolanic material and lime which are present.

The Portland cement may be any of the Types previously listed. In particular, is Portland cement ASTM Type HI may be chosen for its early strength development. A Type IP or IS blended cement is of value since it simplifies manufacturing and reduces costs. Types V and C could be used if a low $C_3A$ (tricalcium aluminate) cement was desirable. In many mixtures, the Portland cement will be present as about 10–60 wt % of the total cementitious material, depending on the wet strength required. It is generally preferred to limit the amount of Portland cement included so that it does not exceed about 40 wt % of the cementitious materials, since Portland cement is much more expensive than calcium sulfate hemihydrate. The amount of pozzolanic materials is related to the amount of tricalcium aluminate. As the Portland cement content is increased, so is the tricalcium aluminate, so that a greater amount of (relatively expensive) pozzolanic material is required. Larger amounts of Portland cement may be used if they contain only small amounts of tricalcium aluminate.

The pozzolanic material (e.g., silica fume, metakaolin, ground granulated blast furnace slag or pulverized fly ash) may be used in amounts up to 40 wt %, and typically will be included as about 6–35 wt % of the mixture of settable calcium sulfate, cement, and lime, preferably 10–23 wt %, depending on the Portland cement content, the amount of tricalcium aluminate present, and the desired strength of the product. If the Portland cement contains less than 5–6 wt % tricalcium aluminate, however, then the amount of the pozzolan could be lower than the suggested range. A pozzolan could be omitted if a Portland cement containing a low level of tricalcium aluminate is used. On the other hand, if a less reactive pozzolan is used, then the amount required may be larger than the suggested range. The preferred pozzolans, such as metakaolin and silica fume, are more expensive than either calcium sulfate hemihydrate or Portland cement and, therefore, they would usually be used only as needed.

Lime, $Ca(OH)_2$, is added in small amounts less than about 5 wt % of the cementitious materials.

The aggregate used may be chosen from known materials. The aggregate is viewed as a filler and need not be pozzolanic, as its effect on the strength of the product is considered to be substantially physical, rather than resulting from a chemical reaction with the cementitious materials. The amounts used in a specific formulation can be chosen to meet the product performance which is required, but where the linear expansion in the presence of water is critical, for example, in backer panels for tile, the volume ratio of the aggregate to cementitious binder should be at least 2/1. In particular, a lightweight sintered shale is preferred, such as those obtained by known processes which thermally expand the raw material. The particle size will generally be between about 4 mm to 20 $\mu$m. Preferably, no more than 5 wt % will be smaller than 20 $\mu$m. It has been found that the amount of aggregate used is important if the expansion in water has to be less than the strain capacity limits of the other elements, as discussed above. As will be clear from FIG. 1, the amount of aggregate relative to the cementitious mixture of calcium sulfate hemihydrate, cement, lime, and pozzolanic material should be at least about 2.0 parts by volume for each 1.0 part by volume of the cementitious mixture, as determined from the in-place volume measurements familiar to those skilled in the art. When the volumetric ratio of aggregate to the cementitious mixture is greater than 2/1, the expansion of the composition in water is further reduced. This improvement in the volume stability of the products is believed to be related to at least three factors. The aggregate acts to restrain the shrinkage or expansion of the cementitious materials, it arrests propagation of cracks, and decreases the relative amount of the cementitious materials.

Building Materials

The cementitious compositions of the invention have many applications, including, but not limited to, backer boards, structural elements, siding, and the like.

In one important application, the cementitious composition may be made as a water-resistant panel for various uses, such as backer boards. The linear expansion in such applications must be limited to avoid cracking of tiles, the panel itself, or joints. Such panels require a facing to improve their resistance to bending loads. Typically, this is done by providing a scrim made of glass fibers on the faces of each panel.

The process for making such panels using the composition of the invention may be briefly described as follows. The settable calcium sulfate, preferably a hemihydrate, e.g., beta, is blended with Portland cement, e.g., Type III, and an active pozzolan (e.g., silica fume, metakaolin, ground granulated blast furnace slag, or pulverized fly ash), and lime to form the cementitious mixture. The cementitious mixture is then blended with the aggregate, e.g., sintered shale, hot water, and the superplasticizer and other additives to achieve the desired fluidity and set time. The mixture may be foamed to further reduce its density. The workable slurry is poured onto a release paper having a glass fiber scrim on top. A second scrim is placed on top of the mixture and embedded to a desired depth. The process may be carried out with forms of the size required or in typical commercial practice on a moving conveyor belt. After the mixture has gained enough strength, it can be cut to the desired panel size and transferred to storage for a sufficient time to complete the curing process.

EXAMPLE 1

A series of compositions were prepared to demonstrate the effect of the volume of the aggregate used relative to the combined volume of calcium sulfate hemihydrate, Portland cement, silica fume (a finely divided active pozzolanic material), and a minor amount of lime. The compositions tested are summarized in Table 1.

TABLE 1

| | Weight % | | | | |
|---|---|---|---|---|---|
| Component | #1 | #2 | #3 | #4 | #5 |
| Portland cement, Type III | 27 | 27 | 27 | 27 | 27 |
| Silica fume[1] | 10 | 10 | 10 | 10 | 10 |
| Calcium sulfate beta hemihydrate | 60 | 60 | 60 | 60 | 60 |
| Lime | 3 | 3 | 3 | 3 | 3 |
| TOTAL cementitious material | 100 | 100 | 100 | 100 | 100 |
| Haydite ™ aggregate[2][3] | 0 | 68.5 | 106.5 | 137 | 172 |
| Water[3] | 68 | 68 | 68 | 73 | 76 |

[1] SKW-Canada - 0.2 μm average size, total silica 95.3 wt %, alumina 0.6 wt %
[2] sintered shale from Hydraulic Press Brick Co.
[3] weight % based on the weight of total cementitious material In addition to the principal components of Table I, each composition contained small amounts of additives commonly found in such compositions, as shown in Table 2.

TABLE 2

| | Weight % Relative To Total Cementitious Material | | | | |
|---|---|---|---|---|---|
| Additive | #1 | #2 | #3 | #4 | #5 |
| Superplasticizer[1] | 3 | 3 | 3.2 | 3.8 | 4.2 |
| CaCl$_2$ | 0.8 | 0.8 | 0.8 | 0.8 | 0.8 |
| DTPA[2] | 0.02 | 0.02 | 0.02 | 0.02 | 0.02 |

[1] water reducing agent ftom Diloflo (Henkel) - 42% concentration
[2] retarder

The amount of water used for preparing a slurry of cementitious material and aggregate was varied to provide a consistent fluidity for each of the five tests. A summary of the relative volumes of the components in the tests is given in Table 3. Note that the amount of water required decreases as the amount of aggregate increases and the cementitious material decreases.

TABLE 3

| | Volume % | | | | |
|---|---|---|---|---|---|
| Component | #1 | #2 | #3 | #4 | #5 |
| Cementitious material | 35.3 | 24.7 | 21.1 | 18.5 | 16.4 |
| Aggregate | 0 | 30 | 40 | 45 | 50 |
| Liquid | 63.9 | 44.7 | 38.3 | 36 | 33.2 |
| Aggregate/cementitious material | 0 | 1.22 | 1.89 | 2.43 | 3.06 |

The slurries were cast in forms ½"×12"×33" (12.7× 304.8×838.2 mm) and surface reinforced with glass fiber scrim. The boards were sealed by covering with stretch wrap plastic sheets to prevent moisture loss, and cured for 7 days at room temperature. After curing, specimens ½"×4"×12" (12.7×101.6×304.8 mm) were prepared, and pairs of metal buttons about 10" (254 mm) apart were glued on both sides of the specimens to serve as reference points for expansion or shrinkage.

The specimens were placed in an oven at 55° C. for 4 days to remove all evaporable water and then immersed in water for periods of time up to 60 days. The specimens were removed at various times and the linear movement was measured. The results are shown in FIG. 1. The oven drying causes shrinkage, while immersing in water causes expansion.

It can be seen that adding aggregate reduces the linear expansion caused by is immersion in water. The linear expansion is sharply reduced as the volume ratio of aggregate to cementitious material increased. Preferably, the volume ratio of aggregate to cementitious material is 2/1 or greater to minimize the linear expansion when exposed to water. Higher ratios will be advantageous, but beyond volume ratios of about 5/1, it is difficult to form boards and the bonding properties of the cementitious paste are degraded.

EXAMPLE 2

A lightweight panel was made having a wet density of 78 lbs/ft$^3$ (1248 kg/m$^3$) or less. The composition was mixed, allowed to cure for 7 days, as described in Example 1, and then cut into panels. Glass fiber scrim was used on both surfaces as reinforcement. The composition is given in Table 4. The weight ratio of the aggregate to cementitious materials is 1.1/1, the volume ratio is 2.05/1.

TABLE 4

| Ingredient | Weight % |
|---|---|
| Portland cement, Type III | 27 |
| Silica fume[1] | 10 |
| CaSO$_4$ beta hemihydrate | 60 |
| Ca(OH)$_2$ | 3 |
| TOTAL cementitious material | 100 |
| Superplasticizer[2] | 1 |
| Lightweight aggregate[3] | 110 |
| Foam water[4] | 1.69 |
| Mixing water | 65.7 |

[1]Elkem - total silica greater than 93 wt %, less than 0.6 wt % alumina
[2]Diloflo (Henkel) - 33% concentration
[3]Gravelite (Ridgelite Lightweight Processing Corp.)
[4]foam agent is Witcolate 1276 (Witco)

Figure 2:
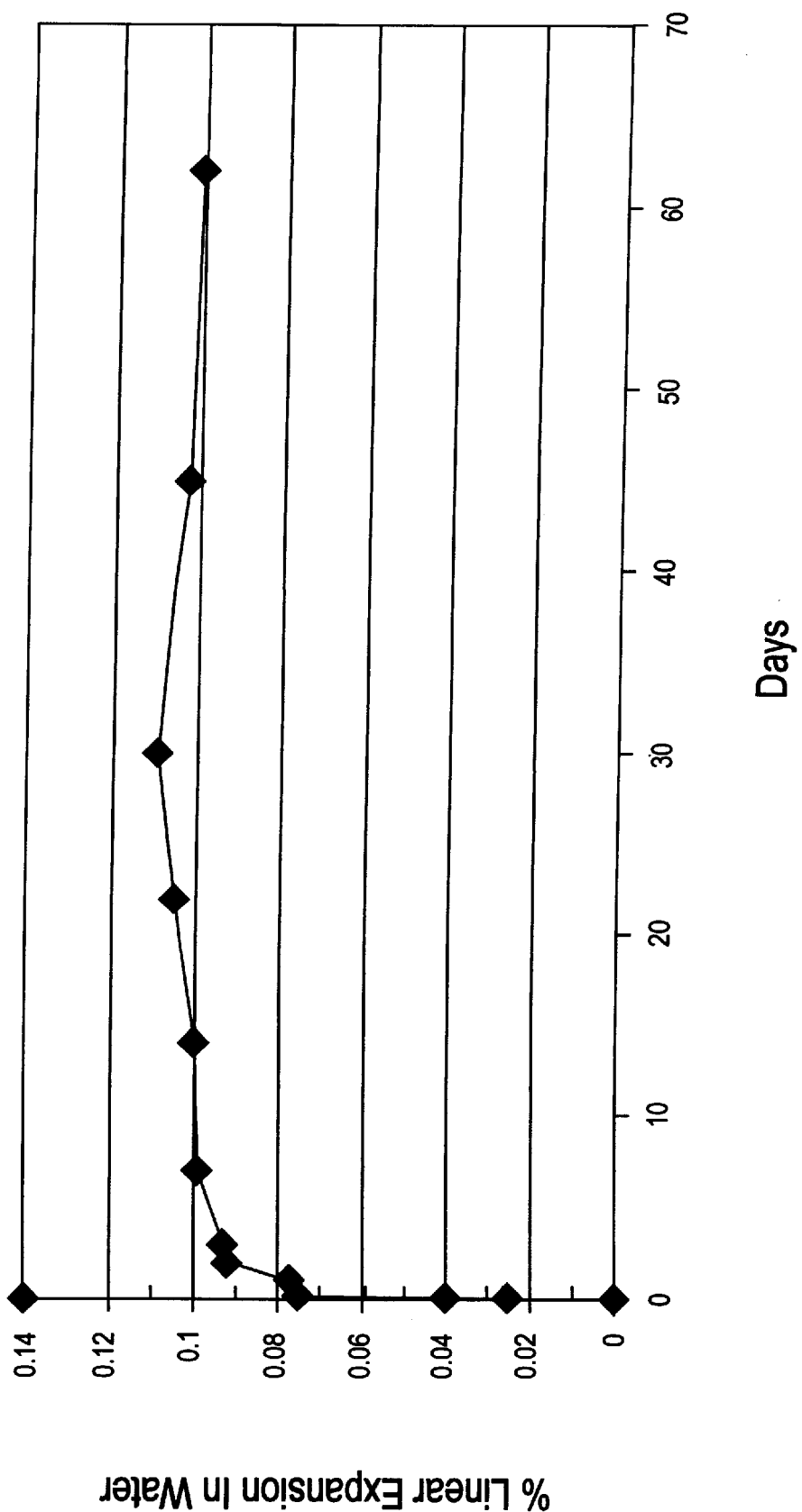
FIG. 2 is a graph illustrating the results of Example 2.

Specimens taken from the panels were placed in a 55° C. oven for 4 days to remove all evaporable moisture and then immersed in water for up to 60 days, with the change in linear movement being measured periodically as described in Example 1. The results are shown in FIG. 2. It can be seen that the panel expanded when placed in water. The expansion leveled off after about 14 days, indicating that no further significant dimensional change was likely. The maximum expansion was about 0.10%, which would be suitable for water resistant panels. No deleterious effects were observed, such as cracking, spalling, or scaling.

EXAMPLE 3

Figure 3:
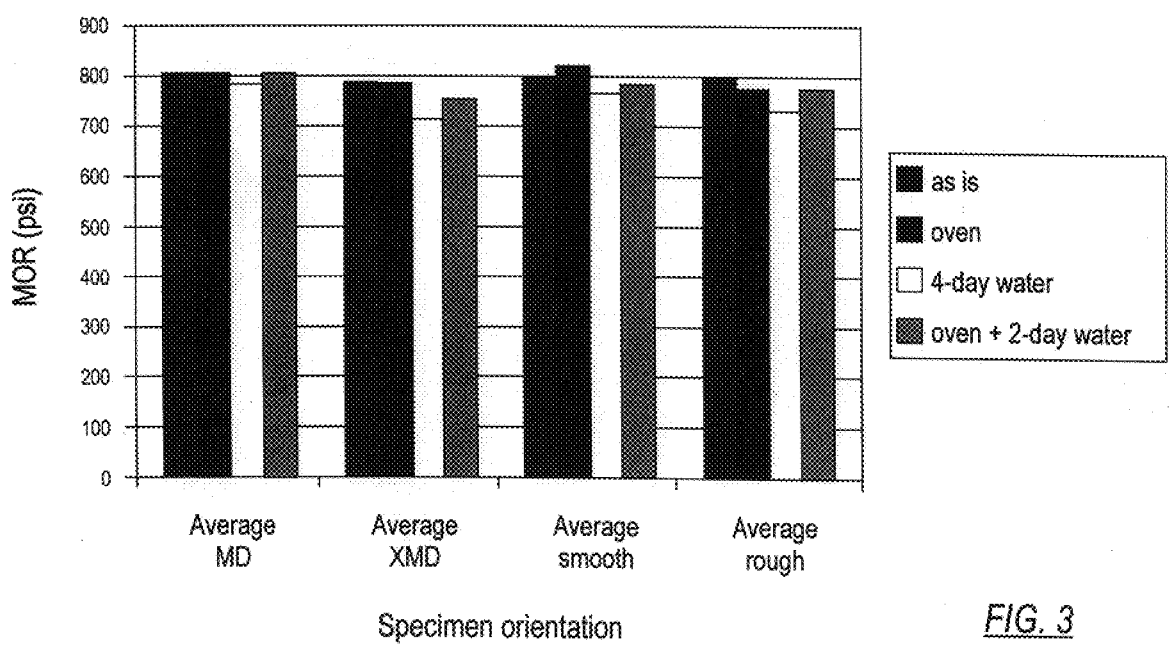
FIG. 3 is a bar graph illustrating the resistance to water immersion by panels of the invention.

Specimens (½"×4"×12") (12.7×101.6×304.8 mm) from the panels of Example 2 were tested for flexural strength in third point loading according to ASTM C947. A load was applied through two noses spaced 3.3 inches (84.6 mm) apart and centered between two supports positioned 10" (254 mm) apart (the "span") near the ends. Thus, the load was applied 3.3 inches (84.6 mm) from each support. The ratio of the span to the panel thickness was about 20/1. The modulus of rupture was determined for each of four specimen orientations. The panels were positioned so that tension was applied on either the smooth side or the rough side of the panel. For each side, the panels were positioned on the supports in the Machine Direction (MD, the panels were made on a continuous panel-making machine), or the Cross Machine direction (XMD). Before testing, samples were conditioned as follows, as made, after 4 days of oven drying, after 4 days of water immersion, and after 4 days of oven drying plus 2 days of water immersion. Samples tested in the machine direction and the cross machine direction were averaged for both smooth and rough side modulus of rupture (MOR) and reported in FIG. 3. Also presented are the results in which the panels tested on the smooth side and the rough side were averaged for both MD and XMD orientations. As will be seen in FIG. 3, the flexural strength of the samples is only slightly affected by water, nor is the strength related to the surface being tested. These results illustrate the superior performance of lightweight panels of the invention. They have a uniform flexural strength in addition to very small linear expansion after immersion in water. Consequently, they may be used as substitutes for cement panels.

EXAMPLE 4

In this Example, silica fume and metakaolin were compared for their effect on compressive strength. The compositions and the dry and wet compressive strength of 2" (50.8 mm) cubes are shown in Table 5.

TABLE 5

| | Pozzolan | | |
|---|---|---|---|
| Component (wt %) | Silica Fume | MetaMax EF[3] | MetaMax[4] |
| Portland cement, Type III | 28 | 28 | 28 |
| Pozzolanic material | 10 | 10 | 10 |
| Beta hemihydrate | 60 | 60 | 60 |
| Ca(OH)$^2$ | 2 | 2 | 2 |
| TOTAL cementitious material | 100 | 100 | 100 |
| Superplasticizer: cementitious | 0.03 | 0.03 | 0.03 |
| Aggregate (sintered shale) | 110 | 110 | 110 |
| Mixing water | 65.99 | 65.99 | 65.99 |
| Aggregate: cementitious (wt)/(vol.) | 1.10/1.97 | 1.10/2.01 | 1.10/2.01 |
| Water: cementitious | 0.68 | 0.68 | 0.68 |
| Dry compressive strength (psi)[1] | 4066/3133 | 5349/4546 | 5656/4587 |
| Wet compressive strength (psi)[2] | 3038 | 3905 | 4106 |

[1]10 day room temperature curing while sealed in plastic and 4 day oven curing at 55° C./30 day room temperature curing while sealed in plastic
[2]10 day room temperature curing while sealed in plastic and 4 day oven curing at 55° C. plus 48 hour immersion in water
[3]Metakaolin Engelhard Industries
[4]Metakaolin Engelhard Industries It can be seen that the compressive strength of the samples containing metakaolin was superior to those containing silica fume. The metakaolin samples had the particle size distribution shown in Table 6 as measured by Sympatec. It will be seen that the metakaolin had larger particles (about 1–20 μm) than are typical of silica fumes (about 0.1–0.3 μm). Such larger particles may be more compatible with the porous nature of the samples tested. Also, the metakaolin hydration products reduce the total volume of the water filling voids compared to the products of the silica fume composition and, thus, increases strength. It should be noted that the metakaolin contained more than 40 wt % $Al_2O_3$ and less than 56 wt % silica. Thus, in contrast to the Stav et al. '083 patent, it appears that neither very pure silica (greater than 92 wt %), nor very low alumina (less than 0.6 wt %) are needed to achieve high compressive strength.

TABLE 6

| | Cumulative Volume % | |
|---|---|---|
| Particle Size (μm) | MetaMax EF | MetaMax |
| 0.90 | 3.90 | 2.52 |
| 1.10 | 8.11 | 6.65 |
| 1.30 | 14.00 | 11.76 |
| 1.55 | 21.65 | 18.48 |
| 1.85 | 30.73 | 26.52 |
| 2.15 | 39.04 | 33.91 |
| 2.50 | 47.06 | 41.01 |
| 3.00 | 56.04 | 48.77 |
| 3.75 | 66.26 | 57.53 |
| 4.50 | 74.27 | 64.69 |
| 5.25 | 80.10 | 70.32 |
| 6.25 | 85.51 | 76.20 |
| 7.50 | 89.95 | 81.54 |
| 9.00 | 93.39 | 86.27 |

TABLE 6-continued

| | Cumulative Volume % | |
|---|---|---|
| Particle Size (μm) | MetaMax EF | MetaMax |
| 10.50 | 95.57 | 89.57 |
| 12.50 | 97.47 | 92.66 |
| 15.00 | 98.88 | 95.26 |
| 18.00 | 99.69 | 97.30 |
| 21.50 | 100 | 98.77 |
| 25.50 | 100 | 99.61 |

EXAMPLE 5

In order to demonstrate that the compressive strength of compositions according to the invention can be controlled, five compositions were prepared in which the total amount of the calcium sulfate hemihydrate was kept the same, while the proportions of alpha and beta hemihydrates were varied. The compositions are summarized in Table 7.

TABLE 7

| | Weight % | | | | |
|---|---|---|---|---|---|
| Component | #1 | #2 | #3 | #4 | #5 |
| Portland cement, Type III | 28 | 28 | 28 | 28 | 28 |
| Silica fume (dry) | 14 | 14 | 14 | 14 | 14 |
| β hemihydrate | 56 | 42 | 28 | 14 | 0 |
| α hemihydrate[1] | 0 | 14 | 28 | 42 | 56 |
| Ca(OH)$_2$ | 2 | 2 | 2 | 2 | 2 |
| TOTAL cementitious material | 100 | 100 | 100 | 100 | 100 |
| Aggregate[2] | 116 | 116 | 116 | 116 | 116 |
| Ratio aggregate/cement (wt) | 1.16 | 1.16 | 1.16 | 1.16 | 1.16 |
| Ratio aggregate/cement (vol.) | 2.06 | 2.07 | 2.08 | 2.09 | 2.10 |
| Superplasticizer[3] | 3.2 | 3.2 | 3.2 | 3.2 | 3.2 |
| Water[4] | 68 | 59.18 | 50.36 | 41.54 | 32.72 |

[1]C-base form, USG
[2]Haydite ™ sintered shale
[3]Diloflo (Henkel) - 42% concentration
[4]amount adjusted to provide comparable fluidity among samples The samples were formed into 2" (50.8 mm) cubes and the dry and wet compressive strength was determined by a Satec test machine. The results are shown in Table 8.

TABLE 8

| | Compressive Strength, psi (Mpa) | | | | |
|---|---|---|---|---|---|
| Sample Condition | #1 | #2 | #3 | #4 | #5 |
| Oven Dry[1] | 4325 | 5572 | 6765 | 9646 | 12230 |
| | (29.82) | (38.42) | (46.64) | (66.51) | (84.32) |
| Wet[2] | 3245 | 4835 | 5982 | 7612 | 11710 |
| | (22.37) | (33.34) | (41.24) | (52.48) | (80.74) |
| Room Temperature[3] | 3778 | 4826 | 5982 | 7612 | 11617 |
| | (26.1) | (33.3) | (41.3) | (52.5) | (80.1) |

[1]8 day room temperature curing while sealed in plastic and 4 day oven curing at 55° C.
[2]as in (1), followed by 2 day immersion in water
[3]day room temperature curing while sealed in plastic It can be seen that the strength of the compositions of the invention can be adjusted by varying the amounts of alpha and beta hemihydrate.

EXAMPLE 6

Metakaolin has been found to provide improved compressive strength compared to silica fume, even in the absence of aggregate. The following compositions were prepared for comparison. They varied only in the type of pozzolan used.

TABLE 9

| | Pozzolan | |
|---|---|---|
| Component (wt %) | Silica Fume | Metakaolin[1] |
| Portland cement, Type III | 28 | 28 |
| Pozzolan | 14 | 14 |
| β calcium sulfate hemihydrate | 56 | 56 |
| Ca(OH)$_2$ | 2 | 2 |
| TOTAL cementitious material | 100 | 100 |
| Superplasticizer[2] | 3 | 3 |
| Water | 64.05 | 64.05 |

[1]MetaMax, Engelhard Industries
[2]Diloflo (Henkel) - 42% concentration

TABLE 10

| | | Compressive Strength, psi (Mpa)[3] | |
|---|---|---|---|
| | | Pozzolan Used | |
| Sample Condition | | Silica Fume | Metakaolin |
| Room temperature curing[1] | 7 days | 1525 (10.5) | 3478 (24.0) |
| | 28 days | 3142 (21.7) | 4987 (34.4) |
| | 60 days | 3469 (23.9) | 5010 (34.5) |
| Oven drying[2] | 7 + 4 days | 3353 (23.1) | 5014 (34.6) |
| | 28 days | 2850 (19.6) | 4220 (29.1) |
| | 60 days | 2871 (19.8) | 4499 (31.0) |

[1]7, 28 and 60 day room temperature curing while sealed in plastic
[2]7 day room temperature curing while sealed in plastic and 4 day oven curing at 55° C. plus 28 and 60 day immersion in water
[3]average of 3 samples It can be seen that the composition containing silica fume as the pozzolan provided lower compressive strength than the composition containing metakaolin, even when no aggregate was included.

EXAMPLE 7

Increasing the amount of metakaolin has been found to increase the compressive strength of compositions including aggregate, as shown in Table 12. Compositions containing 5–20 wt % metakaolin on cementitious solids were prepared according to Table 11.

TABLE 11

| Component (wt %) | Sample No. | | | |
|---|---|---|---|---|
| | 1 | 2 | 3 | 4 |
| Portland cement, Type III | 28 | 28 | 28 | 28 |
| MetaMax (metakaolin) | 5 | 10 | 15 | 20 |
| Ca(OH)$_2$ | 2 | 2 | 2 | 2 |
| β calcium sulfate hemihydrate | 65 | 60 | 55 | 50 |
| TOTAL cementitious material | 100 | 100 | 100 | 100 |
| Superplasticizer[1] | 3 | 3 | 3 | 3 |
| Potassium tartrate | 0.24 | 0.24 | 0.24 | 0.24 |
| Aggregate | 110 | 110 | 110 | 110 |
| Water | 65.99 | 65.99 | 65.99 | 65.99 |
| Aggregate: cementitious (wt) | 1.1 | 1.1 | 1.1 | 1.1 |
| Aggregate: cementitious (vol.) | 2 | 2.01 | 2.01 | 2.01 |

[1]Diloflo (Henkel) - 42% concentration

Two inch (50.8 mm) cubes were made from each composition, cured for 7 days in sealed plastic bags at room temperature, followed by oven drying at 55° C. for 4 days, and tested as in previous examples, both wet and dry. The compressive strengths are shown in Table 12.

TABLE 12

| | Sample No. | | | |
|---|---|---|---|---|
| | 1 | 2 | 3 | 4 |
| Dry strength[1], psi (MPa) | 5378 (37.1) | 6406 (44.2) | 7729 (53.3) | 8128 (56.1) |
| Wet strength[2], psi (MPa) | 2660 (18.3) | 4906 (33.8) | 6030 (41.6) | 6616 (45.6) |

[1]7 day room temperature curing while sealed in plastic and 4 day oven curing at 55° C.
[2]as in (1), followed by 2 day immersion in water

EXAMPLE 8

Example 7 was repeated, except that calcium sulfate alpha hemihydrate was used, rather than beta hemihydrate. The compositions containing 5–20 wt % metakaolin on cementitious solids are given Table 13.

TABLE 13

| Component | Sample No. (wt %) | | | |
|---|---|---|---|---|
| | 1 | 2 | 3 | 4 |
| Portland cement, Type III | 28 | 28 | 28 | 28 |
| MetaMax (metakaolin) | 5 | 10 | 15 | 20 |
| Ca(OH)$_2$ | 2 | 2 | 2 | 2 |
| α hemihydrate | 65 | 60 | 55 | 50 |
| TOTAL cementitious material | 100 | 100 | 100 | 100 |
| Superplasticizer[1] | 3 | 3 | 3 | 3 |
| Potassium tartrate | 0.21 | 0.21 | 0.21 | 0.21 |
| Aggregate | 110 | 110 | 110 | 110 |
| Water | 30.71 | 30.71 | 30.71 | 30.71 |
| Aggregate: cementitious (wt) | 1.1 | 1.1 | 1.1 | 1.1 |
| Aggregate: cementitious (vol.) | 2 | 2 | 2 | 2 |

[1]Diloflo (Henkel) - 42% concentration

Two inch (50.8) cubes were prepared and tested for wet and dry strength as in Example 7. The results are shown in Table 14.

TABLE 14

| Sample | Compressive Strength, psi (MPa) | | | |
|---|---|---|---|---|
| Condition | 1 | 2 | 3 | 4 |
| Dry strength | 10044 (69.3) | 11045 (76.2) | 12639 (87.2) | 12187 (84.0) |
| Wet strength | 10001 (69.0) | 11019 (76.0) | 11742 (81.0) | 11606 (80.0) |

EXAMPLE 9

Example 2 was repeated to compare the linear expansion of panels made with metakaolin or silica fume. Three compositions were prepared, as shown in Table 15.

TABLE 15

| Component | Sample No. (wt %) | | |
|---|---|---|---|
| | 1 | 2 | 3 |
| Portland cement, Type III | 28 | 28 | 28 |
| Silica fume | 10 | — | — |
| MetaMax (metakaolin) | — | 10 | 14 |
| Ca(OH)$_2$ | 2 | 2 | 2 |
| β hemihydrate | 60 | 60 | 56 |
| TOTAL cementitious material | 100 | 100 | 100 |
| Superplasticizer[1] | 3 | 3 | 3 |
| Potassium tartrate | 0.5 | 0.5 | 0.5 |
| Aggregate | 110 | 110 | 110 |
| Water | 65.99 | 65.99 | 65.99 |
| Aggregate:cementitious (wt) | 1.1 | 1.1 | 1.1 |
| Aggregate:cementitious (vol.) | 1.97 | 2.01 | 2.01 |

[1]Diloflo (Henkel) - 42% concentration

The panels were tested as in Example 2 and the linear expansion measured after immersion in water, as shown in Table 16.

TABLE 16

| | Linear Expansion, % Sample No. | | |
|---|---|---|---|
| Immersion, days | 1 | 2 | 3 |
| 1 | 0.093 | 0.092 | 0.072 |
| 7 | 0.109 | 0.093 | 0.074 |
| 14 | 0.112 | 0.095 | 0.078 |
| 30 | 0.112 | 0.099 | 0.079 |

While the expansion of all three samples satisfied the performance criteria for such panels, the results indicate that the expansion for panels made with metakaolin was somewhat less and, thus, superior to the expansion of the panel made with silica to fume.

The preceding is intended to describe, but not limit, the scope of the invention, which is defined by the following claims.

What is claimed is:

1. A composition for use in construction materials comprising:
   (a) a cementitious material comprising:
      (1) about 25–80 wt % of a settable calcium sulfate;
      (2) about 10–60 wt % Portland cement;
      (3) up to about 40 wt % of a finely divided pozzolanic material;
      (4) less than 5 wt % of $Ca(OH)_2$; and
   (b) an aggregate, the volume of said aggregate to the cementitious material of (a) being at least about 2/1.

2. A composition of claim 1, further comprising at least one of the group consisting of:
   (c) up to about 2 wt % of an accelerator for Portland cement based on the amount of (a)(2), (a)(3), and (a)(4);
   (d) up to about 1.8 wt % of a superplasticizer based on the cementitious material of (a);
   (e) about 0.3–2.0 wt % of an accelerator for gypsum based on the amount of (a)(1);
   (f) up to about 0.08 wt % of a retarder based on the cementitious material of (a);
   (g) about 2–7 wt % of a glycol relative to the amount of water to be mixed with said cementitious material of (a); and
   (h) up to about 75% by volume of a stable foam.

3. A composition of claim 2, wherein said accelerator for Portland cement is calcium chloride.

4. A composition of claim 2, wherein said superplasticizer is the sodium salt of polynaphthalene sulfonate.

5. A composition of claim 2, wherein said accelerator for gypsum is calcium sulfate dihydrate.

6. A composition of claim 2, wherein said retarder is selected from the group consisting of DTPA (diethylenetriaminepentacetic acid), tartaric acid, and alkali salts of tartaric acid.

7. A composition of claim 1, wherein said pozzolanic material is about 6–35 wt % of said cementitious material.

8. A composition of claim 1, wherein said Portland cement is selected from the group consisting of ASTM Type I, Type III, Type IP, Type IS, Type V, and Type C.

9. A composition of claim 1, wherein said settable calcium sulfate is calcium sulfate beta hemihydrate.

10. A composition of claim 1, wherein said settable calcium sulfate is calcium sulfate alpha hemihydrate.

11. A composition of claim 1, wherein said settable calcium sulfate is a mixture of calcium sulfate alpha and beta hemihydrates.

12. A composition of claim 1, wherein said pozzolanic material is silica fume, metakaolin, ground granulated blast furnace slag, or pulverized fly ash.

13. A composition of claim 12, wherein said pozzolanic material is silica fume.

14. A composition of claim 12, wherein said pozzolanic material is metakaolin.

15. A composition of claim 12, wherein said pozzolanic material is ground granulated blast furnace slag.

16. A composition of claim 12, wherein said pozzolanic material is pulverized fly ash.

17. A composition of claim 1, wherein said aggregate is a sintered shale.

18. A composition of claim 1, wherein said aggregate includes no more than about 5 wt % of particles smaller than 20 $\mu$m.

19. A panel comprising:
   (a) a composition of claim 1 formed into a panel; and
   (b) a scrim facing on each surface of said panel.

20. A panel comprising:
   (a) a composition of claim 2 formed into a panel; and
   (b) a scrim facing on each surface of said panel.

21. A backer panel comprising:
   (a) a cementitious binder resulting from the curing of an aqueous mixture, said mixture comprising, on a dry basis:
      (1) about 50–80 wt % of beta calcium sulfate hemihydrate;
      (2) about 10–40 wt % of Type III Portland cement;
      (3) about 6–35 wt % of a finely divided pozzolanic material selected from the group consisting of silica fume, metakaolin, ground granulated blast furnace slag and pulverized fly ash;
      (4) greater than zero, but less than 5 wt % $Ca(OH)_2$;
   (b) an aggregate, the volume ratio of said aggregate to the cementitious binder of (a) being at least 2/1; and
   (c) at least one additive selected from the group consisting of:
      (1) up to about 2 wt % of an accelerator for Portland cement, based on the amount of (a)(2), (a)(3), and (a)(4);
      (2) up to about 1.8 wt % of a superplasticizer based on the cementitious binder of (a);
      (3) about 0.3–2.0 wt % of an accelerator for gypsum based on the amount of (a)(1);
      (4) up to about 0.08 wt % of a retarder based on the cementitious binder of (a);
      (5) about 2–7 wt % of a glycol relative to the amount of water which has been mixed with the cementitious binder of (a); and
      (6) up to about 75% by volume of a stable foam.

22. A composition for use in construction materials comprising
   (a) a cementitious material comprising:
      (1) about 25–80 wt % of a settable calcium sulfate;
      (2) about 1–60 wt % Portland cement;
      (3) up to about 40 wt % metakaolin; and
      (4) less than 5 wt % $Ca(OH)_2$;
   (b) an aggregate, the volume ratio of said aggregate to the cementitious material of (a) being at least about 2/1.

23. A cementitious material of claim 22, wherein the settable calcium sulfate is selected from the group consisting of alpha hemihydrate, beta hemihydrate, and mixtures thereof.

24. A cementitious material of claim 22, wherein the Portland cement is selected from the group consisting of ASTM Type I, Type III, Type IP, Type IS, Type V, and Type C.

* * * * *